(12) United States Patent
Naitou et al.

(10) Patent No.: US 11,035,454 B2
(45) Date of Patent: Jun. 15, 2021

(54) ROTATIONAL-FORCE TRANSMITTING PART

(71) Applicant: Fanuc Corporation, Yamanashi (JP)

(72) Inventors: Yuuki Naitou, Yamanashi (JP); Genki Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/548,432

(22) Filed: Aug. 22, 2019

(65) Prior Publication Data

US 2020/0109772 A1    Apr. 9, 2020

(30) Foreign Application Priority Data

Oct. 5, 2018 (JP) .............................. JP2018-190420

(51) Int. Cl.
 | | |
 |---|---|
 | *F16H 57/028* | (2012.01) |
 | *F16H 57/00* | (2012.01) |
 | *F16H 57/02* | (2012.01) |

(52) U.S. Cl.
CPC ..... *F16H 57/0031* (2013.01); *F16H 57/0037* (2013.01); *F16H 57/02004* (2013.01)

(58) Field of Classification Search
CPC ........................... F16H 57/0031; F16H 57/029
USPC ............................................ 74/446, 451, 447
See application file for complete search history.

(56) References Cited

U.S. PATENT DOCUMENTS

| 826,288 A | * | 7/1906 | Tilgner | |
|---|---|---|---|---|
| 1,424,203 A | * | 8/1922 | Keller ..................... | F16H 55/12 |
| | | | | 74/414 |
| 1,498,809 A | * | 6/1924 | Plunkett ................. | F16H 55/12 |
| | | | | 74/447 |
| 3,660,704 A | * | 5/1972 | Paine ...................... | H02K 7/06 |
| | | | | 310/80 |

(Continued)

FOREIGN PATENT DOCUMENTS

| CA | 2920158 A1 | 8/2016 |
|---|---|---|
| EP | 1571067 A1 | 9/2005 |
| GB | 2262796 A | 6/1993 |
| JP | H05-032862 U | 4/1993 |

(Continued)

OTHER PUBLICATIONS

Yamao, Munehiro; Notice of Reasons for Refusal; Japanese Patent Application No. 2018-190420; dated Aug. 18, 2020; 3 pages.

*Primary Examiner* — Randell J Krug
(74) *Attorney, Agent, or Firm* — Shackleford, Bowen, McKinley & Norton, LLP

(57) ABSTRACT

Provided is a rotational-force transmitting part including: a rotation support member that is supported, with respect to a first member, so as to be rotatable about a predetermined axis by means of a bearing and that is provided with a first fitting surface formed of a cylindrical outer surface or a cylindrical inner surface centered on the axis; a rotational-force transmitting member that transmits a rotational force with respect to a second member and that is provided with a second fitting surface to be fitted onto the first fitting surface; an annular elastic member that is disposed at such a position as to seal a space between the first fitting surface and the second fitting surface; and a fixing member that fixes the rotational-force transmitting member and the rotation (Continued)

support member in a state in which the first fitting surface and the second fitting surface are fitted.

4 Claims, 5 Drawing Sheets

(56) References Cited

U.S. PATENT DOCUMENTS

| | | | | |
|---|---|---|---|---|
| 4,912,998 | A * | 4/1990 | Sugano | F16H 57/023 |
| | | | | 74/409 |
| 5,022,478 | A * | 6/1991 | Hartmann | B60K 17/28 |
| | | | | 180/53.1 |
| 5,117,704 | A * | 6/1992 | Kish | B64C 27/12 |
| | | | | 464/75 |
| 5,302,046 | A * | 4/1994 | Mathes | F16D 1/0841 |
| | | | | 403/367 |
| 10,359,029 | B2 * | 7/2019 | Smet | F03D 15/00 |
| 10,648,545 | B2 * | 5/2020 | Mizuuchi | F16H 25/2204 |
| 2005/0224278 | A1 | 10/2005 | Segawa | |
| 2007/0012207 | A1 * | 1/2007 | Takenouchi | B41F 31/302 |
| | | | | 101/335 |
| 2016/0076635 | A1 * | 3/2016 | Bell | F04C 29/005 |
| | | | | 74/396 |
| 2016/0230871 | A1 | 8/2016 | Hirano et al. | |
| 2016/0236703 | A1 | 8/2016 | Kuwabara | |
| 2016/0341183 | A1 * | 11/2016 | Smet | F03D 80/85 |

FOREIGN PATENT DOCUMENTS

| | | |
|---|---|---|
| JP | H05-248513 A | 9/1993 |
| JP | 2004034874 A | 2/2004 |
| JP | 2005-337333 A | 12/2005 |
| JP | 2008067552 A | 3/2008 |
| JP | 2009090923 A | 4/2009 |
| JP | 4442421 B2 | 3/2010 |
| JP | 2011163374 A | 8/2011 |
| JP | 4883349 B2 | 2/2012 |
| JP | 2012039793 A | 2/2012 |
| JP | 2016-145630 A | 8/2016 |
| JP | 6333191 B2 | 5/2018 |

* cited by examiner

ROTATIONAL-FORCE TRANSMITTING PART

This application is based on Japanese Patent Application No. 2018-190420, the contents of which are incorporated herein by reference.

TECHNICAL FIELD

The present invention relates to a rotational-force transmitting part.

BACKGROUND ART

In the related art, there is a known rotational-force transmitting part in which a gear and a shaft for rotatably supporting the gear by means of a bearing are formed of separate parts, and the gear and the shaft are concentrically assembled and used (for example, Japanese Unexamined Patent Application, Publication No. 2011-163374).

In order to concentrically assemble the gear and the shaft, a fitting portion that is formed of a shaft part and a hole part to be fitted to both the gear and the shaft is provided, and a fitting tolerance for the fitting portion is reduced, thus improving the concentricity.

SUMMARY OF INVENTION

According to one aspect, the present invention provides a rotational-force transmitting part including: a rotation support member that is supported, with respect to a first member, so as to be rotatable about a predetermined axis by means of a bearing and that is provided with a first fitting surface formed of a cylindrical outer surface or a cylindrical inner surface centered on the axis; a rotational-force transmitting member that transmits a rotational force with respect to a second member and that is provided with a second fitting surface to be fitted to the first fitting surface; an annular elastic member that is disposed at such a position as to seal a space between the first fitting surface and the second fitting surface; and a fixing member that fixes the rotational-force transmitting member and the rotation support member in a state in which the first fitting surface and the second fitting surface are fitted.

DESCRIPTION OF EMBODIMENTS

A rotational-force transmitting part 1 according to one embodiment of the present invention will be described below with reference to the drawings.

Figure 1:
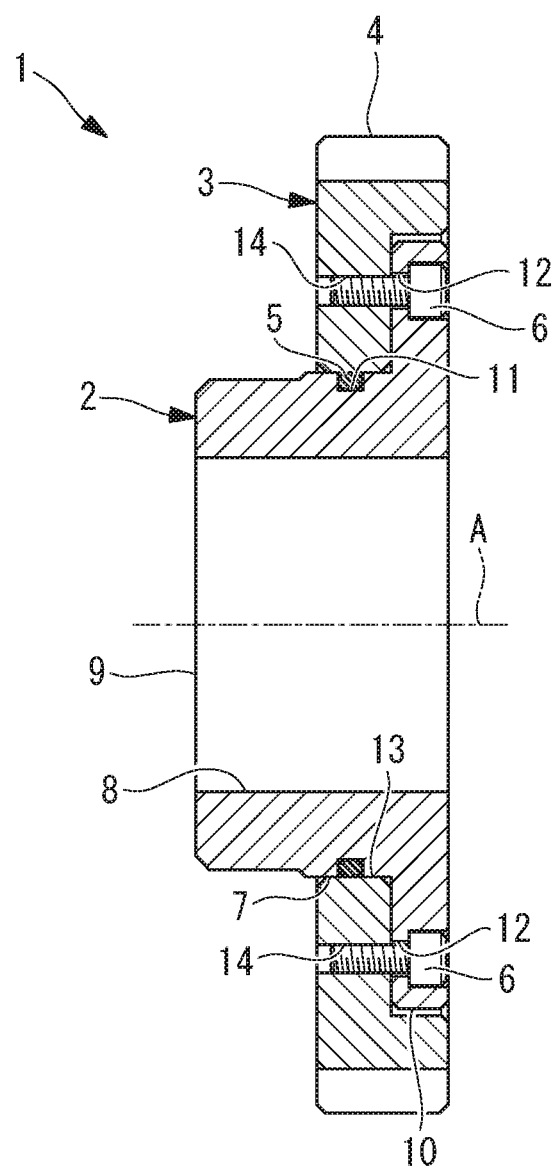
FIG. 1 is a longitudinal sectional view showing a rotational-force transmitting part according to one embodiment of the present invention.
Figure 2:
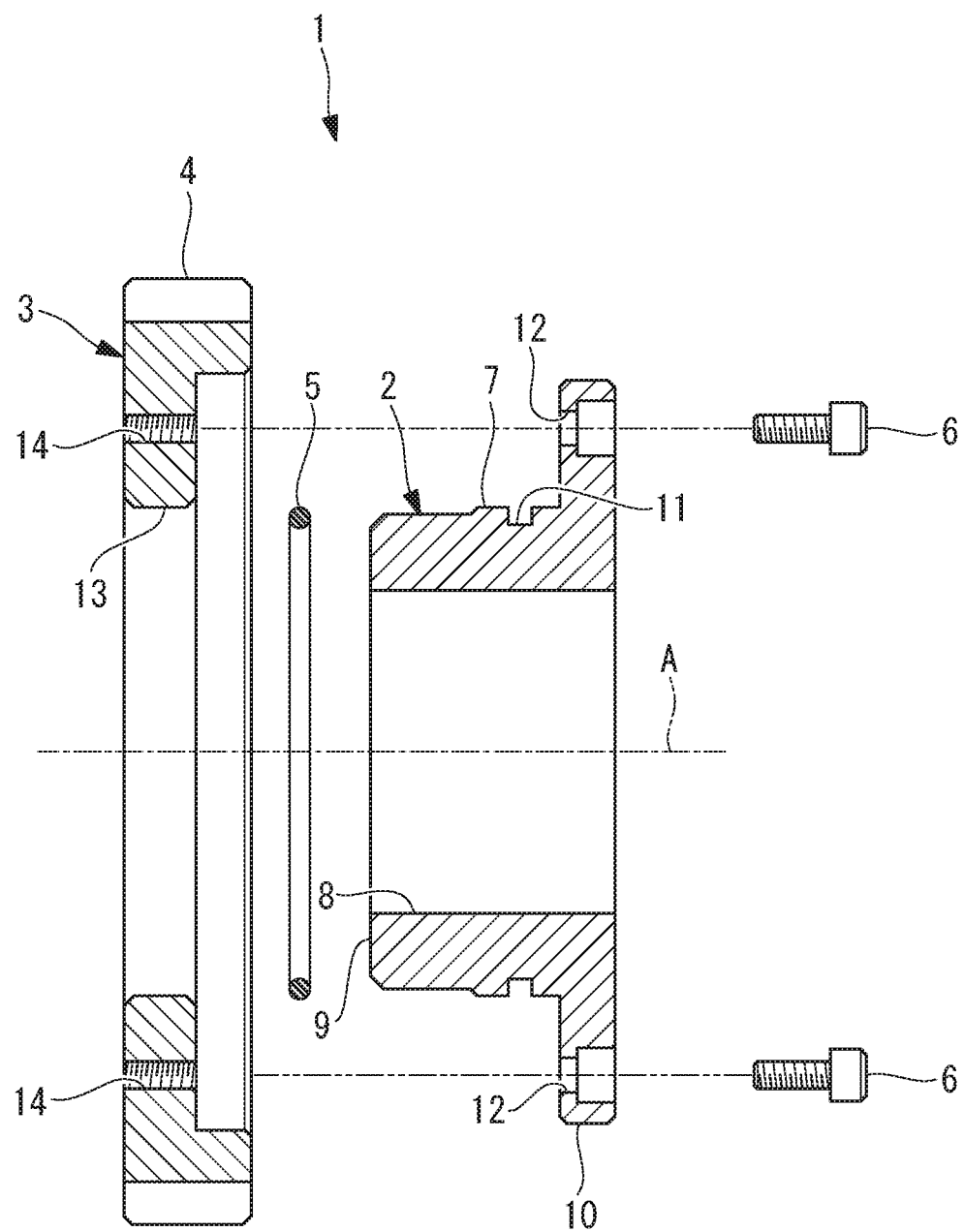
FIG. 2 is an exploded longitudinal sectional view of the rotational-force transmitting part shown in FIG. 1.

As shown in FIGS. 1 and 2, the rotational-force transmitting part 1 of this embodiment is provided with: a shaft (rotation support member) 2 that is supported on a rod (first member, not shown) so as to be rotatable about an axis A by means of a bearing; a spur gear member (rotational-force transmitting member) 3 that has, on an outer surface thereof, a gear 4 to be engaged with another gear (second member, not shown); an O-ring (elastic member) 5; and bolts (fixing members) 6.

The shaft 2 is provided with: a cylindrical section 9 that has a cylindrical outer surface (first fitting surface) 7 and a central hole 8 through which the rod is made to pass; and a collar-like flange section 10 that extends radially outward, at one end of the cylindrical section 9 in the axial direction. An O-ring groove 11 for accommodating the O-ring 5 is provided on the cylindrical outer surface 7. In the flange section 10, a plurality of through-holes 12 through which the bolts 6 are made to pass in the thickness direction are provided at intervals in the circumferential direction.

The spur gear member 3 is formed into a ring plate shape that has a cylindrical inner surface (second fitting surface) 13 to be fitted onto the cylindrical outer surface 7 of the shaft 2. In the spur gear member 3, a plurality of female screws 14 into which the bolts 6 that have passed through the through-holes 12, which are provided in the flange section 10 of the shaft 2, are fastened are provided in the same positional relationship with the through-holes 12.

The operation of the thus-configured rotational-force transmitting part 1 of this embodiment will be described below.

In order to assemble the rotational-force transmitting part 1 of this embodiment, the O-ring 5 is accommodated in the O-ring groove 11, which is provided on the cylindrical outer surface 7 of the cylindrical section 9 of the shaft 2, and the cylindrical inner surface 13 is fitted onto the cylindrical outer surface 7 while compressing the O-ring 5 in radial directions. Accordingly, because the spur gear member 3 is mounted on the shaft 2, the female screws 14, which are provided in the spur gear member 3, and the through-holes 12, which are provided in the flange section 10 of the shaft 2, are aligned in phase, and the bolts 6 are inserted into the through-holes 12 and are fastened into the female screws 14. Accordingly, the rotational-force transmitting part 1 in which the shaft 2 and the spur gear member 3 have been fixed is formed.

According to the rotational-force transmitting part 1 of this embodiment, due to the elasticity of the O-ring 5, which is sandwiched between the cylindrical outer surface 7 of the shaft 2 and the cylindrical inner surface 13 of the spur gear member 3, the cylindrical inner surface 13 is evenly pressed radially outward over the entire circumference, with respect to the cylindrical outer surface 7. As a result, even if a large fitting tolerance between the cylindrical outer surface 7 and the cylindrical inner surface 13 is set, the cylindrical inner surface 13 is center-aligned with the cylindrical outer surface 7, thus precisely aligning the axis A of the shaft 2 with the axis of the spur gear member 3.

By evenly fixing the shaft 2 and the spur gear member 3, which are in such a state as to be precisely center-aligned in this way, by means of the plurality of bolts 6 disposed in the circumferential direction, there is an advantage in that it is possible to suppress the eccentricity of the gear 4 with respect to the inner surface of the central hole 8 of the shaft 2 and to prevent change in backlash with respect to another gear, the change being caused by rotation.

Because it is not necessary to excessively reduce the fitting tolerance, there is an advantage in that it is possible to reduce the machining cost and to improve the ease of assembly.

By forming the spur gear member 3 and the shaft 2 of separate members, it is possible to eliminate a waste of materials and to use materials that are individually suitable for the gear 4 and the shaft 2, compared with a case in which the spur gear member 3 and the shaft 2 are formed as an integrated part.

In this embodiment, although a spur gear is shown as an example of the gear 4, it is also possible to adopt a helical gear or another arbitrary type of gear.

Figure 3:
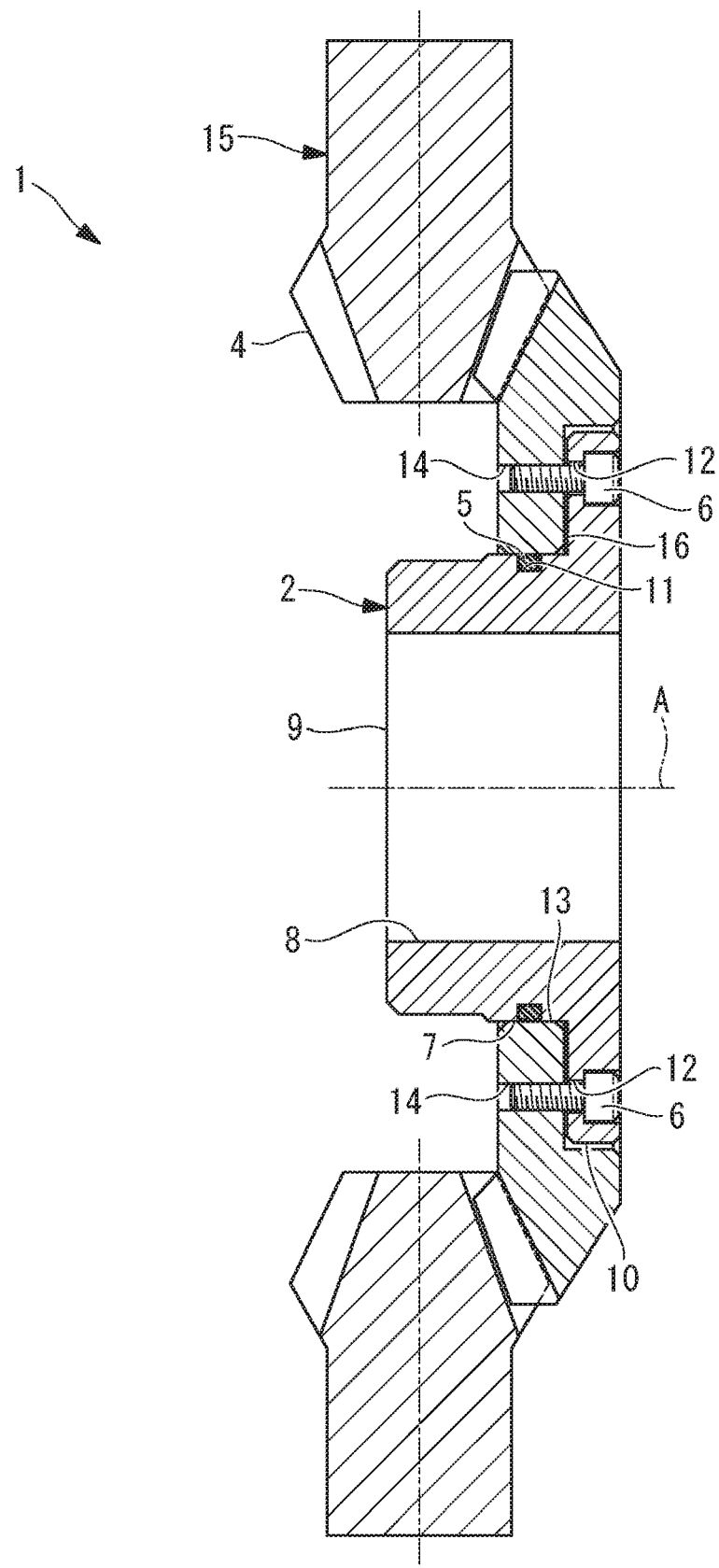
FIG. 3 is a longitudinal sectional view showing a modification of the rotational-force transmitting part shown in FIG. 1.
Figure 4:
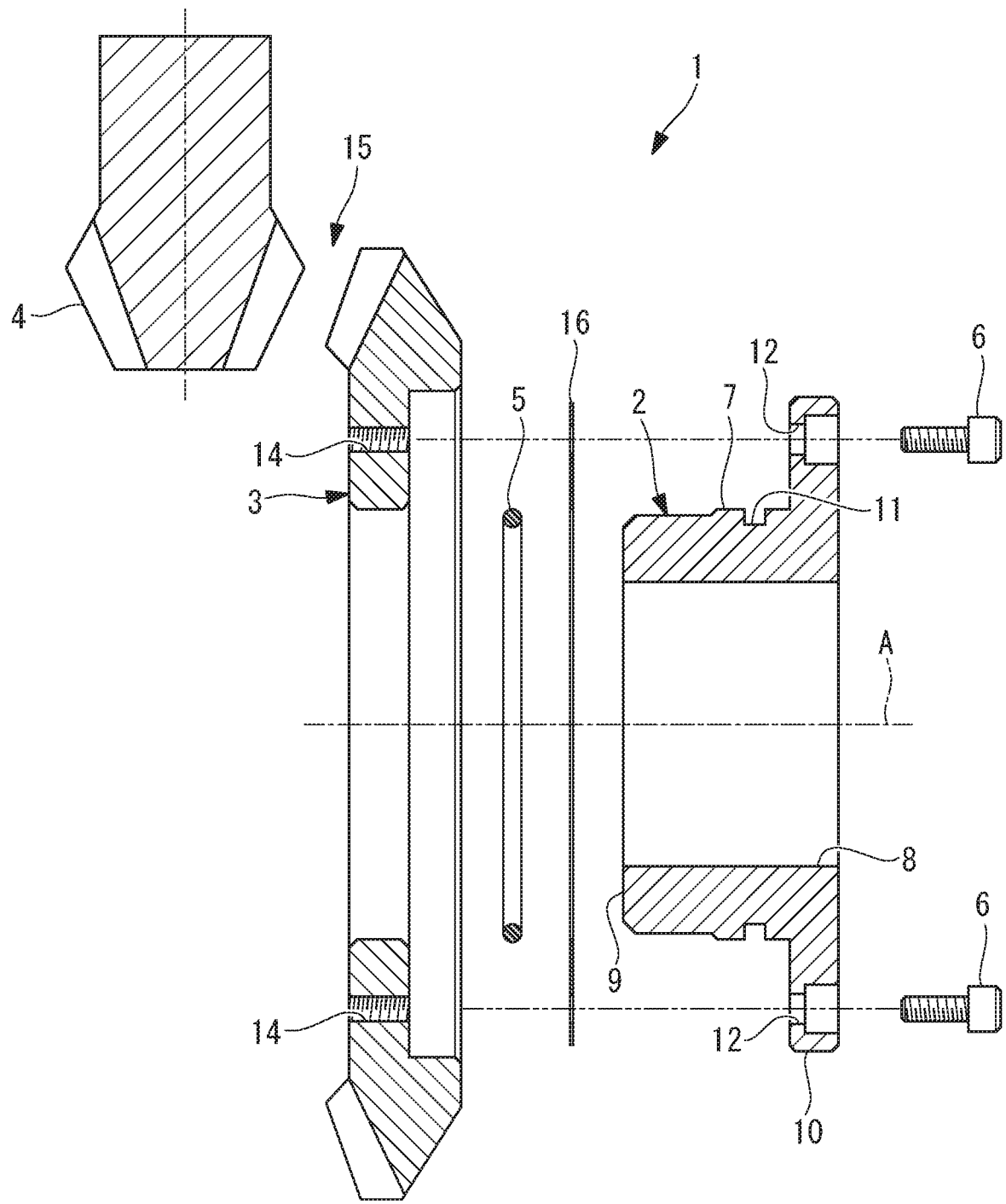
FIG. 4 is an exploded longitudinal sectional view of a rotational-force transmitting part shown in FIG. 3.

FIGS. 3 and 4 show a case in which a bevel gear is adopted as the gear 4. Although the configuration of the rotational-force transmitting part 1 is the same as in the case in which the spur gear member 3 is used, it is also possible to insert a backlash-adjustment shim 16 between the flange section 10 of the shaft 2 and a bevel gear member (rotational-force transmitting member) 15, in the axial direction.

Although the gear 4 is shown as an example power transmission member, instead of this, it is also possible to adopt a pulley that transmits a rotational force to another pulley (second member) by means of a belt or to adopt a sprocket that transmits a rotational force to another sprocket (second member) by means of a chain.

Although the shaft 2, which is a hollow shaft having the central hole 8, is shown as an example rotation support member, instead of this, it is also possible to adopt a solid shaft.

In this embodiment, although a structure in which the bolts 6 that are made to pass through the through-holes 12 in the flange section 10 are fastened into the female screws 14 in the spur gear member 3 is shown as an example fixing means for fixing the rotation support member and the rotational-force transmitting member, instead of this, it is also possible to adopt a structure in which the female screws 14 are provided in the flange section 10, the through-holes 12 are provided in the spur gear member 3, and, when the bolts 6 are fastened into the female screws 14 in the flange section 10, the bolts 6 are inserted into the through-holes 12 in the spur gear member 3.

Figure 5:
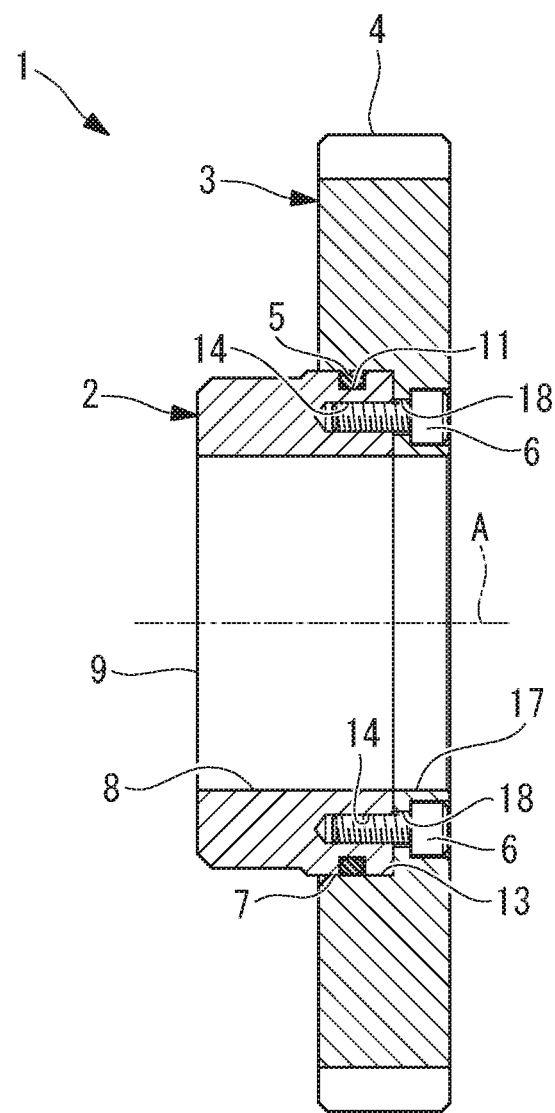
FIG. 5 is a longitudinal sectional view showing another modification of the rotational-force transmitting part shown in FIG. 1.

In this embodiment, although a structure in which the shaft 2 is provided with the flange section 10 is shown, instead of this, as shown in FIG. 5, it is also possible to adopt a structure in which the spur gear member 3 is provided with a flange section 17. In FIG. 5, although the flange section 17 of the spur gear member 3 is provided with through-holes 18, and the shaft 2 is provided with female screws 14, instead of this, it is also possible to adopt a structure in which the flange section 17 of the spur gear member 3 is provided with the female screws 14, and the shaft 2 is provided with the through-holes 18.

As a result, the following aspect is derived from the above described embodiment.

According to one aspect, the present invention provides a rotational-force transmitting part including: a rotation support member that is supported, with respect to a first member, so as to be rotatable about a predetermined axis by means of a bearing and that is provided with a first fitting surface formed of a cylindrical outer surface or a cylindrical inner surface centered on the axis; a rotational-force transmitting member that transmits a rotational force with respect to a second member and that is provided with a second fitting surface to be fitted to the first fitting surface; an annular elastic member that is disposed at such a position as to seal a space between the first fitting surface and the second fitting surface; and a fixing member that fixes the rotational-force transmitting member and the rotation support member in a state in which the first fitting surface and the second fitting surface are fitted.

According to this aspect, when the first fitting surface of the rotation support member and the second fitting surface of the rotational-force transmitting member are fitted, the annular elastic member is disposed at such a position as to seal the space therebetween, so that, even if the fitting tolerance between the first fitting surface and the second fitting surface is large, the elasticity of the annular elastic member evenly acts over the entire circumference; thus, a radial clearance between the first fitting surface and the second fitting surface is kept constant over the entire circumference, and the rotation support member and the rotational-force transmitting member are center-aligned.

In this state, the rotation support member and the rotational-force transmitting member are fixed by the fixing member, thereby making it possible to form a rotational-force transmitting part in which the rotation support member and the rotational-force transmitting member are center-aligned.

Specifically, because it is not necessary to excessively reduce the fitting tolerance between the first fitting surface and the second fitting surface, it is possible to achieve a reduction in the machining cost and an improvement in the ease of assembly and to obtain stable backlash by reducing the eccentricity while easily achieving center-alignment.

In the above-described aspect, the rotation support member may be a shaft, and the first fitting surface may be a cylindrical outer surface.

With this configuration, when the second fitting surface, which is formed of the cylindrical inner surface of the rotational-force transmitting member, is fitted onto the first fitting surface, which is formed of the cylindrical outer surface of the shaft, the annular elastic member is disposed therebetween, thereby making it possible to achieve center-alignment between the shaft and the rotational-force transmitting member.

In the above-described aspect, the rotational-force transmitting member may be a gear, a pulley, or a sprocket.

With this configuration, if the rotational-force transmitting member is a gear, it is possible to suppress a change in backlash due to a reduction in eccentricity, and, if the rotational-force transmitting member is a pulley or a sprocket, it is possible to suppress a change in tension of a belt or a chain.

In the above-described aspect, the elastic member may be an O-ring.

With this configuration, due to the O-ring, which is a typical machine part, center-alignment can be achieved with ease and at a low cost.

REFERENCE SIGNS LIST

1 rotational-force transmitting part
2 shaft (rotation support member)
3 spur gear member (rotational-force transmitting member)
5 O-ring (elastic member)
6 bolt (fixing member)
7 cylindrical outer surface (first fitting surface)
13 cylindrical inner surface (second fitting surface)
15 bevel gear member (rotational-force transmitting member)
A axis

The invention claimed is:

1. A rotational-force transmitting part comprising:
    a rotation support member that is supported, with respect to a first member, so as to be rotatable about a predetermined axis and that is provided with a first fitting surface formed of a cylindrical outer surface or a cylindrical inner surface centered on the axis;
    a rotational-force transmitting member that transmits a rotational force with respect to a second member and that is provided with a second fitting surface to be fitted to the first fitting surface;
    a groove provided on the first fitting surface of the rotation support member;
    an annular elastic member that is disposed in the groove between the first fitting surface and the second fitting surface, wherein the second fitting surface is evenly pressed by the annular elastic member over an entire circumference with respect to the first fitting surface so as to seal a space therebetween and to absorb force applied in the radial direction; and
    a fixing member that fixes the rotational-force transmitting member and the rotation support member in a state in which the first fitting surface and the second fitting surface are fitted.

2. The rotational-force transmitting part according to claim 1, wherein the rotation support member is a shaft, and the first fitting surface is a cylindrical outer surface.

3. The rotational-force transmitting part according to claim 1, wherein the rotational-force transmitting member is a gear, a pulley, or a sprocket.

4. The rotational-force transmitting part according to claim 1, wherein the annular elastic member is an O-ring.

* * * * *